(12) United States Patent
Yun et al.

(10) Patent No.: US 6,218,670 B1
(45) Date of Patent: Apr. 17, 2001

(54) SCINTILLATOR REFLECTIVE LAYER COEXTRUSION

(75) Inventors: Jae-Chul Yun, Naperville; Adam Para, St. Charles, both of IL (US)

(73) Assignee: Universities Research Association, Inc., Washington, DC (US)

(*) Notice: Subject to any disclaimer, the term of this patent is extended or adjusted under 35 U.S.C. 154(b) by 0 days.

(21) Appl. No.: 09/240,186

(22) Filed: Jan. 29, 1999

(51) Int. Cl.[7] ........................................... G01T 1/24
(52) U.S. Cl. .............................. 250/370.11; 250/487.1
(58) Field of Search ........................ 250/370.11, 487.1

(56) References Cited

U.S. PATENT DOCUMENTS

| | | |
|---|---|---|
| 4,107,534 | 8/1978 | Piltingsrud . |
| 4,543,485 * | 9/1985 | Ishii et al. ........................ 250/487.1 |
| 4,631,409 * | 12/1986 | Sparacia et al. ..................... 250/368 |
| 4,658,141 | 4/1987 | Wilt et al. . |
| 4,713,198 * | 12/1987 | Simonetti ........................ 250/487.1 |
| 4,720,426 | 1/1988 | Englert et al. . |
| 5,457,527 | 10/1995 | Manns et al. . |
| 5,663,005 | 9/1997 | Dooms et al. . |
| 5,968,425 * | 10/1999 | Bross et al. ........................... 264/21 |

OTHER PUBLICATIONS

"Plastics Materials and Processes (excerpt)", Van Nostrad Reinhold Co., p. 597, Schwartz et al, 1982.

* cited by examiner

*Primary Examiner*—Frank G. Font
*Assistant Examiner*—Zandra V. Smith
(74) *Attorney, Agent, or Firm*—McAndrews, Held & Malloy, Ltd.

(57) ABSTRACT

A polymeric scintillator has a reflective layer adhered to the exterior surface thereof. The reflective layer comprises a reflective pigment and an adhesive binder. The adhesive binder includes polymeric material from which the scintillator is formed. A method of forming the polymeric scintillator having a reflective layer adhered to the exterior surface thereof is also provided. The method includes the steps of (a) extruding an inner core member from a first amount of polymeric scintillator material, and (b) coextruding an outer reflective layer on the exterior surface of the inner core member. The outer reflective layer comprises a reflective pigment and a second amount of the polymeric scintillator material.

12 Claims, 1 Drawing Sheet

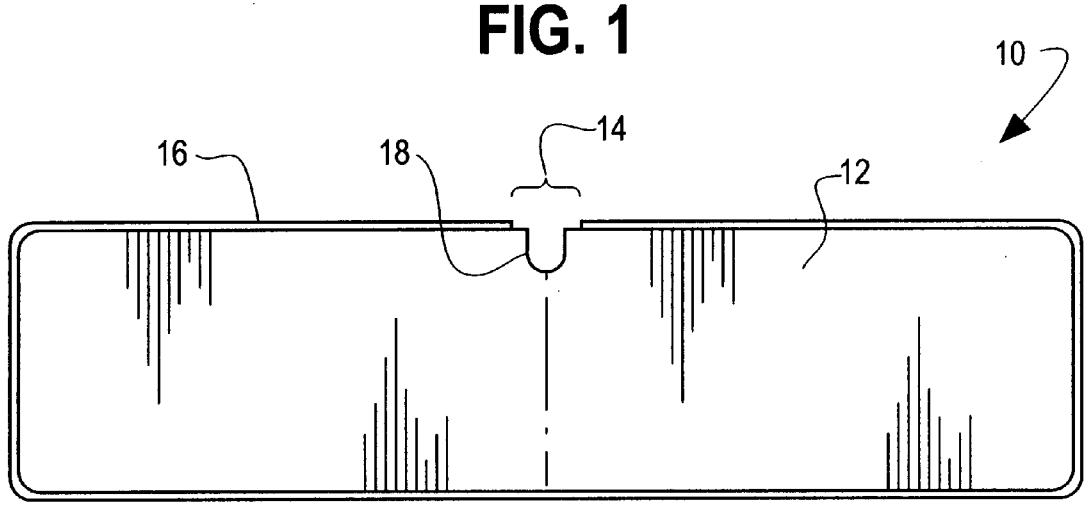
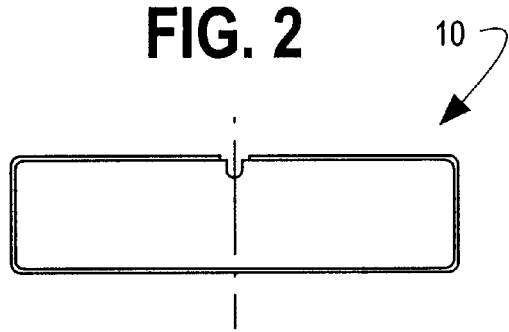

SCINTILLATOR REFLECTIVE LAYER COEXTRUSION

CROSS-REFERENCE TO RELATED APPLICATION

This application relates to and claims priority benefits from U.S. Provisional Patent Application Ser. No. 60/073,048 filed Jan. 29, 1998, which is incorporated by reference herein in its entirety.

This invention was made with Government support under Contract No. DE-AC02-76CH03000, awarded by the United States Department of Energy. The Government has certain rights in the invention.

FIELD OF THE INVENTION

The present invention relates generally to plastic scintillators, and in particular to a crystalline polymeric scintillator having a thin layer of the same polymer mixed with a white pigment that is laminated or coextruded to the exterior surface of the scintillator.

BACKGROUND OF THE INVENTION

Scintillators are materials that emit flashes or pulses of light when they interact with ionizing radiation such as gamma rays. Plastic scintillators formed from crystalline polystyrene are particularly well suited for radiation detection applications. Crystalline polystyrene is readily melt processable and capable of being extruded into a variety shapes and sizes to meet the spatial requirements of the detector involved.

When crystalline polystyrene scintillators are employed in radiation detection applications, conventional practice is to paint the scintillator white or wrap the exterior surface of the scintillator with a white sheet material such as, for example, TYVEK brand polymeric sheet material. The scintillator is generally painted or wrapped such that the exterior surface has a white coating thereon. The white coating improves that light yield from the scintillator and simplifies the handling of the scintillator by providing a protective exterior surface. The process of painting or wrapping a white coating on the exterior surface of a scintillator is labor intensive, however, thereby increasing the cost to manufacture the scintillator.

SUMMARY OF THE INVENTION

A polymeric scintillator has a reflective layer adhered to the exterior surface thereof. The reflective layer comprises a reflective pigment and an adhesive binder. The adhesive binder comprises polymeric material from which the scintillator is formed.

In one embodiment of the polymeric scintillator, the polymeric material is crystalline polystyrene. The polymeric material can also be formed from other polymeric scintillator materials generally.

In one embodiment, the reflective pigment is a white pigment, preferably titanium dioxide. In another embodiment, the reflective pigment is a white pigment comprising magnesium oxide. Other pigments can be employed depending upon the spectral distribution of light to be collected.

In one embodiment of the polymeric scintillator, the proportion of titanium dioxide in the reflective layer is about 10% by weight.

In a method of forming a polymeric scintillator having a reflective layer adhered to the exterior surface thereof, the method comprises:

(a) extruding an inner core member from a first amount of polymeric scintillator material;

(b) coextruding an outer reflective layer on the exterior surface of the inner core member, the outer reflective layer comprising a reflective pigment and a second amount of the polymeric scintillator material.

BRIEF DESCRIPTION OF THE DRAWINGS

FIG. 1 is an enlarged end view of a polymeric scintillator having a reflective layer laminated or coextruded on the exterior surface thereof.

FIG. 2 is a full-scale end view of the polymeric scintillator illustrated in FIG. 1.

DETAILED DESCRIPTION OF THE PREFERRED EMBODIMENT

Turning first to FIG. 1, an extruded scintillator 10 has an inner core member 12 formed from a polymeric scintillator material. A reflective layer 16 circumscribes the scintillator 12. As shown in FIG. 1, a portion 14 is left uncoated to enable light collection through a wave-shifting fiber (not shown) disposed in channel 18.

Reflective layer 16 includes the same polymeric scintillator material, preferably crystalline polystyrene, from which core member 12 is formed. Reflective layer 16 also has incorporated therein an amount of reflective pigment, preferably white pigment, most preferably titanium dioxide. Reflective layer 16 improves the light yield from scintillator 10 and provides a protective exterior surface for handling scintillator 10 and assembling the detection device (not shown) into which scintillator 10 is incorporated. By laminating layer 16 directly onto the exterior surface of scintillator core member 12, the manual wrapping or painting of a reflective layer is eliminated.

FIG. 2 is a full scale depiction of the polymeric scintillator illustrated in FIG. 1. In the embodiment disclosed herein, the reflective pigment is a white pigment, preferably titanium dioxide. In another embodiment, the reflective pigment is a white pigment comprising magnesium oxide. Other pigments can be employed depending upon the spectral distribution of light to be collected. In applications involving the collection of blue light (less than 450 nm), for example, magnesium oxide (MgO) may be most suitable for such light frequencies. In applications involving the collection of green-blue light (approximately 450 nm), for example, titanium dioxide ($TiO_2$) may be most suitable.

Conventional coextrusion techniques for producing a sheet or film having two or more different materials laminated together are known. See, for example, *Plastics Materials and Processes* by S. Schwartz and S. Goodman, published by Van Nostrand Reinhold Co. (1982) at page 597, the coextrusion technique description of which is incorporated herein by reference. Employing such a coextrusion method, a polymeric scintillator having a reflective layer adhered to the exterior surface thereof can be formed where the method comprises:

(a) extruding an inner core member from a first amount of polymeric scintillator material;

(b) coextruding an outer reflective layer on the exterior surface of the inner core member, the outer reflective layer comprising a reflective pigment and a second amount of the polymeric scintillator material.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications which incorporate those features coming within the spirit and scope of the invention.

What is claimed is:

1. A polymeric scintillator having a reflective layer adhered to the exterior surface thereof, said reflective layer comprising a reflective pigment and an adhesive binder, said adhesive binder comprising polymeric material from which said scintillator is formed.

2. The polymeric scintillator of claim 1 wherein said polymeric material is crystalline polystyrene.

3. The polymeric scintillator of claim 1 wherein said reflective pigment is a white pigment.

4. The polymeric scintillator of claim 3 wherein said white pigment is titanium dioxide.

5. The polymeric scintillator of claim 4 wherein the proportion of titanium dioxide in said reflective layer is about 10% by weight.

6. The polymeric scintillator of claim 3 wherein said white pigment is magnesium oxide.

7. A method of forming a polymeric scintillator having a reflective layer adhered to the exterior surface thereof, said method comprising:
    (a) extruding an inner core member from a first amount of polymeric scintillator material;
    (b) coextruding an outer reflective layer on the exterior surface of said inner core member, said outer reflective layer comprising a reflective pigment and a second amount of said polymeric scintillator material.

8. The method of claim 7 wherein said polymeric scintillator material is crystalline polystyrene.

9. The method of claim 7 wherein said reflective pigment is a white pigment.

10. The method of claim 9 wherein said white pigment is titanium dioxide.

11. The method of claim 10 wherein the proportion of titanium dioxide in said reflective layer is about 10% by weight.

12. The method of claim 9 wherein said white pigment is magnesium oxide.

* * * * *